US010332409B2

(12) United States Patent
Gavrilets et al.

(10) Patent No.: US 10,332,409 B2
(45) Date of Patent: Jun. 25, 2019

(54) MIDAIR COLLISION THREAT DETECTION AND ASSESSMENT USING VISUAL INFORMATION

(71) Applicant: Rockwell Collins, Inc., Cedar Rapids, IA (US)

(72) Inventors: Vladislav Gavrilets, McLean, VA (US); William T. Kirchner, Leesburg, VA (US); Keith M. Allen, Centreville, VA (US); Allen D. Wu, Dublin, CA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 89 days.

(21) Appl. No.: 15/277,998

(22) Filed: Sep. 27, 2016

(65) Prior Publication Data
US 2018/0090018 A1    Mar. 29, 2018

(51) Int. Cl.
*G08G 5/04*    (2006.01)
*G06K 9/00*    (2006.01)
*G06T 7/246*   (2017.01)

(52) U.S. Cl.
CPC ......... *G08G 5/045* (2013.01); *G06K 9/00771* (2013.01); *G06T 7/246* (2017.01); *G06T 2207/30241* (2013.01); *G06T 2207/30261* (2013.01)

(58) Field of Classification Search
CPC ............ G08G 5/045; G08G 5/04; G08G 5/06; G08G 5/065; G08G 7/00; G08G 7/02; G08G 9/00; G08G 9/02; G06K 9/00624; G06K 9/00; G06K 9/00201; G06T 7/0042; G06T 7/00; G06T 7/2033; G06T 7/60; G06T 7/70; G06T 7/73; G06T 7/74; G06T 7/75; G06T 7/77

USPC .......................... 382/103–104, 106–107, 236
See application file for complete search history.

(56) References Cited

U.S. PATENT DOCUMENTS

| 2005/0109872 A1* | 5/2005 | Voos | G08G 5/0013 244/3.17 |
| 2014/0253722 A1* | 9/2014 | Smyth | G01P 3/38 348/135 |
| 2015/0262018 A1* | 9/2015 | Buchanan | G06K 9/00771 382/104 |

OTHER PUBLICATIONS

Gray, R., and Regan, D., Accuracy of Estimating Time to Collision using Binocular and Monocular Information, Jun. 4, 1997, 14 pages.

* cited by examiner

*Primary Examiner* — Dwayne D Bost
*Assistant Examiner* — Stephen M Brinich
(74) *Attorney, Agent, or Firm* — Donna P. Suchy; Daniel M. Barbieri (57) ABSTRACT

A collision avoidance system includes a processor configured to determine first and second positions of an intruder in first and second images, respectively, determine an angular position change of the intruder by comparing the first and second positions, determine a rate of change of a line of sight angle from an aircraft to the intruder based on the angular position change and a time between the first and second images, determine a rate of change of the angular size of the intruder based on a difference in angular size of the intruder from the first to second image and the time between the first and second images, and provide an alert to an operator of the aircraft in response to the ratio of the rate of change of the line of sight angle and the rate of change of the angular size of the intruder being less than a threshold.

20 Claims, 4 Drawing Sheets

MIDAIR COLLISION THREAT DETECTION AND ASSESSMENT USING VISUAL INFORMATION

BACKGROUND

The inventive concepts disclosed herein relate generally to the field of detection and assessment of intruders. More particularly, embodiments of the inventive concepts disclosed herein relate to determining whether an intruder poses a collision or near-miss threat to an aircraft without using radar.

Collision avoidance systems typically employ radar systems and are used by aircraft to warn aircraft operators of the presence of an intruder, such as another aircraft, that may present a threat of collision. If a potential threat is detected, the collision avoidance system may indicate a maneuver for an aircraft operator to undertake that will reduce the possibility of a collision. When two or more aircraft involved in a near collision each have collision avoidance systems, or have pilots with a visual line of sight to each respective aircraft, each of the pilots may make a maneuver to reduce the risk of collision based on an indication provided by the collision avoidance system or based on their perception of the other aircraft. The risk of an aircraft colliding with an intruder increases if the intruder is an unmanned aircraft (e.g., an unmanned drone), or if the aircraft and intruder are both unmanned drones. For example, unmanned drones may be much smaller than traditional aircraft, and may be more difficult for radar systems of other aircraft to detect. Some drones are too small, or do not generate enough lift, to be equipped with radar systems or traditional collision avoidance systems, such as those requiring a radar system. Furthermore, an aircraft, whether controlled remotely or piloted by a human onboard the aircraft, may be unable to communicate with an intruder if the intruder is a remotely operated unmanned drone. Unmanned drones may further pose a risk to aircraft if the unmanned drone becomes uncooperative, or malfunctions, and can no longer be controlled by its operator.

SUMMARY

In one aspect, the inventive concepts disclosed herein are directed to an aircraft collision avoidance system. The system includes at least one processor with a non-transitory processor-readable medium storing processor-executable code. The processor-executable code causes at least one processor to receive first image data and second image data from an optical sensor, the first image data associated with a first image captured by the optical sensor, the second image data associated with a second image captured by the optical sensor, determine a first position and a first angular size of an intruder in the first image data, determine a second position and a second angular size of the intruder in the second image data, determine an angular position change of the intruder based on a comparison of the first and second positions and first and second angular sizes, determine a rate of change of a line of sight angle from an aircraft to the intruder based on the angular position change and a time elapsed between the first and second images, determine a rate of change of the angular size of the intruder based on a difference in angular size of the intruder from the first image to the second image and the time elapsed between the first and second images, and provide an alert to an operator of the aircraft in response to the ratio of the rate of change of the line of sight angle and the rate of change of the angular size of the intruder being less than a threshold.

In a further aspect, the inventive concepts disclosed herein are directed to a method. The method includes receiving first image data and second image data from an optical sensor, the first image data associated with a first image captured by the optical sensor, the second image data associated with a second image captured by the optical sensor, determining a first position of an intruder in the first image data, determining a second position of the intruder in the second image data, determining an angular position change of the intruder based on a comparison of the first position with the second position, determining a rate of change of a line of sight angle from the aircraft to the intruder based on the angular position change and an elapsed time between capturing the first image data and the second image data, determining a rate of change of the angular size of the intruder based on a difference in angular size of the intruder from the first image data to the second image data and the time elapsed between the first and second images, and providing an alert to an operator of the aircraft in response to the ratio of the rate of change of the line of sight angle and the rate of change of the angular size of the intruder being less than a threshold.

In a further aspect, the inventive concepts disclosed herein are directed to an aircraft collision avoidance system. The system includes an optical sensor and at least one processor with a non-transitory processor-readable medium storing processor-executable code. The processor-executable code causes at least one processor to receive first image data and second image data from the optical sensor. The first image data is associated with a first image captured by the optical sensor. The second image data is associated with a second image captured by the optical sensor. The processor-executable code further causes at least one processor to determine a rate of change of a line of sight angle of the intruder and a rate of change of the angular size of the intruder with respect to an aircraft based on a comparison of the first image data and the second image data, and provide an alert to an operator of the aircraft in response to the ratio of the rate of change of the line of sight angle and the rate of change of the angular size of the intruder being less than a threshold, the threshold comprising a ratio of a determined size of the intruder.

BRIEF DESCRIPTION OF THE DRAWINGS

Implementations of the inventive concepts disclosed herein may be better understood when consideration is given to the following detailed description thereof. Such description makes reference to the included drawings, which are not necessary to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to midair collision threat detection and assessment using visual information. The inventive concepts disclosed herein can be utilized in a number of control systems for various types of applications, sensing systems, and display systems. While the present disclosure describes systems and methods implementable for an airborne aircraft collision avoidance system, such collision avoidance systems can be wholly or partially implemented using ground-based or satellite-based components, or adapted for in any type of environment (e.g., in another aircraft, a spacecraft, a ground-based vehicle, a water-based vehicle, or in a non-vehicle application such as a ground-based display system, an air traffic control system, a radar system, a virtual display system). While certain examples and embodiments of the inventive concepts disclosed herein are described with respect to a pilot of a manned or unmanned aircraft, it will be appreciated that users other than a pilot may use and benefit from the inventive concepts disclosed herein with respect to other vehicles or and objects.

Figure 1:
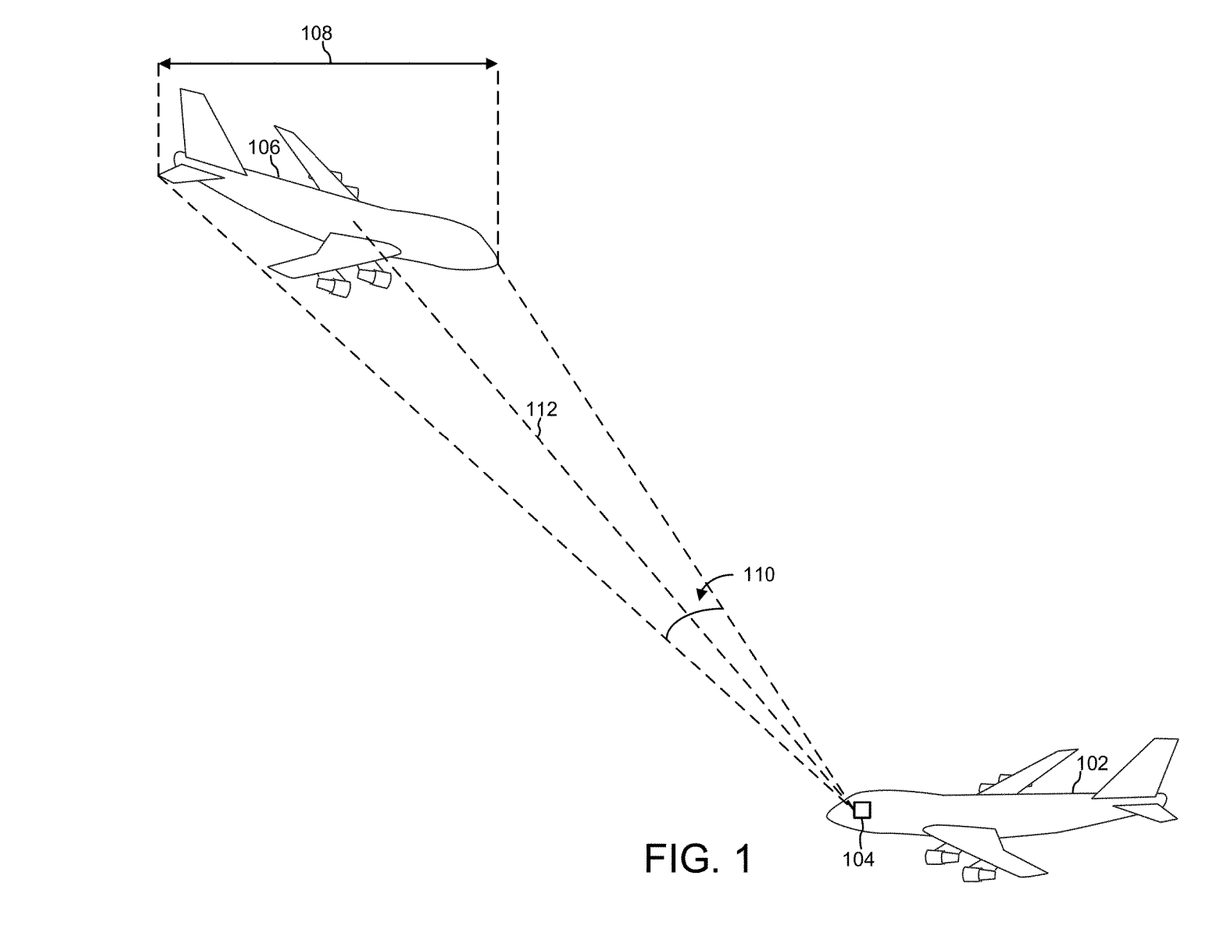
FIG. 1 is a schematic illustration of an aircraft using a collision avoidance system to detect an intruder according to the inventive concepts disclosed herein.

Referring now to FIG. 1, a schematic illustration of an aircraft 102 using a collision avoidance system 104 to detect an intruder 106 is shown according to the inventive concepts disclosed herein. As will be described in greater detail with respect to FIGS. 2-3, the collision avoidance system 104 is configured to detect the intruder 106, acquire at least two images of the intruder 106 (e.g., via an optical camera), compare the images to determine an angular position change of the intruder 106, determine a rate of change of a line of sight angle from the aircraft 102 to the intruder 106 based on the angular position change and a time elapsed between acquisition of the two images, determine a rate of change of the angular size (i.e., looming rate) of the intruder 106 based on a difference in angular size 110 of the intruder from the first image to the second image and a time elapsed between acquisition of the two images, and to provide an alert to the pilot of the aircraft 102 of a potentially dangerous collision or a near collision in response to the ratio of the rate of change of the line of sight angle and the rate of change of the angular size of the intruder 106 being less than a threshold so that the operator can maneuver the aircraft 102 to reduce a risk of collision or automatically control the aircraft 102 to maneuver the aircraft 102 to reduce a risk of collision with the intruder 106. The aircraft 102 and the intruder 106 may be manned or unmanned aircraft. In some embodiments, the aircraft 102 may be a drone (e.g., a ScanEagle unmanned aerial vehicle) and the intruder 106 may be another aircraft, such as another drone or a manned aircraft (e.g., a commercial airliner, a Cessna 172).

Figure 2:
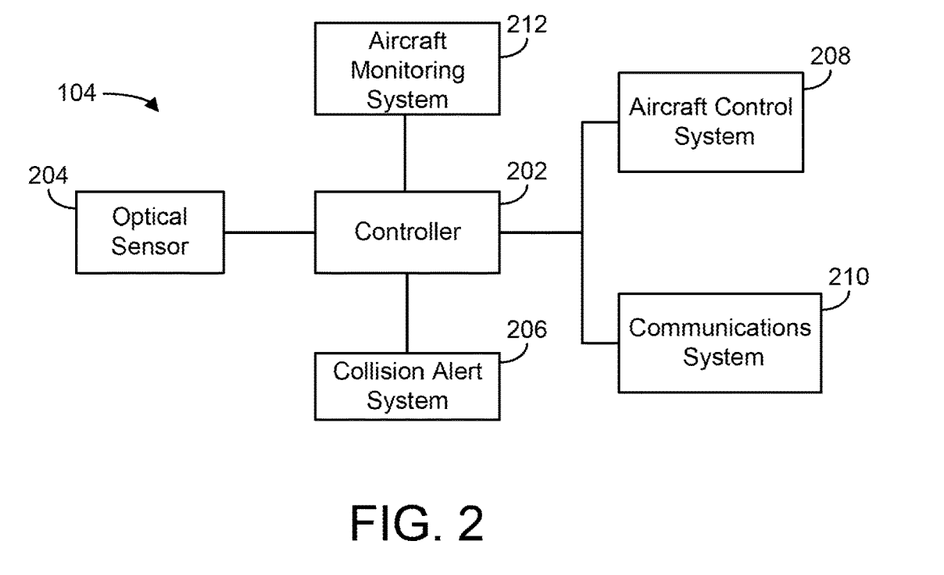
FIG. 2 is a block diagram of an exemplary embodiment of the collision avoidance system of FIG. 1.

Referring now to FIG. 2, a block diagram of an exemplary embodiment of the collision avoidance system 104 of FIG. 1 is shown according to the inventive concepts disclosed herein. The collision avoidance system 104 includes a controller 202, an optical sensor 204, a collision alert system 206, a collision avoidance system 208, a communications system 210, and an aircraft monitoring system 212.

The controller 202 is configured to control operation of the aircraft and to send data to and receive data from, or otherwise facilitate electronic data communications, with other components of the collision avoidance system 104 and other systems, such as remote systems including satellite-based systems or ground-based systems. For example, in one embodiment, the collision avoidance system 104 may receive information from a system remote from the aircraft 102 to facilitate identification and detection of the intruder 106 (e.g., sensor data, image data, weather data, non-weather hazard data). The controller 202 may further interface with an aircraft control system 208, aircraft monitoring system, or other aircraft system. The controller 202 is configured to receive input from the various other systems, such as the optical sensor 204 and the communications system 210. The structure of the controller 202 is shown in greater detail in FIG. 3. In some embodiments, the controller 202 is configured to perform any action described with respect to any of the various components and systems associated with the collision avoidance system 104 as described herein.

The optical sensor 204 includes one or more sensors for capturing or otherwise acquiring an image of the intruder 106. The optical sensor 204 may be at least one of a video camera, a still picture camera, a short wave infrared camera, a long wave infrared camera, and a night vision camera. The optical sensor 204 may include only a single camera, two cameras, or three or more cameras. In one embodiment, the optical sensor 204 is at least one of a monocular camera, an electro-optical sensor, and a high resolution camera. The optical sensor 204 may detect non-visible, near-infrared radiation such as that emitted by many runway and landing lights. The optical sensor 140 may also include low light level image intensifying image sensing capabilities. In one exemplary embodiment, the optical sensor 140 is mounted on an aircraft (e.g., aircraft 102) to detect forward-looking external scene topography, such as natural or manmade features of a place or region to show their relative positions and elevation with respect to the aircraft 102 and the intruder 106. Accordingly, the optical sensor 140 is configured to capture image data representative of an actual scene including the intruder 106 in any direction relative to the aircraft 102. In one embodiment, the optical sensor 104 includes at least six cameras.

The collision alert system 206 is configured to provide an alert to an operator of an aircraft or an observer. For example, the collision alert system 206 may be configured to provide a visual, audio, or tactile alert to the pilot of the aircraft 102, flight crew of the aircraft 102, and to an air traffic controller. The collision alert system 206 is configured to provide the alert in response to a projected position of the intruder 106 being within a threshold distance from a projected position of the aircraft 102. The threshold distance may be expressed in terms of a ratio of the wingspan or maximum linear dimension 108 of the intruder 106. For example, in some embodiments, the threshold distance is ten wingspans of the intruder 106. In some embodiments, the collision alert system 206 may be integrated with or work in conjunction with an aircraft flight display, an electronic flight bag, and a personal device carried by the pilot of the aircraft 102, flight crew of the aircraft 102, and to an air traffic controller. In some embodiments, the alert includes an estimated time of collision of the aircraft 102 and the intruder 106 and a suggested maneuver for the pilot of the aircraft 102 to make to avoid or reduce the likelihood of colliding with the intruder 106. For example, in one embodiment, the alert may instruct the pilot of the aircraft 102 to increase or decrease altitude or to steer the aircraft 102 in a certain direction.

The aircraft control system 208 is configured to automatically control the aircraft 102 to avoid colliding with the intruder 106. The aircraft control system 208 may be an autopilot feature that controls the aircraft 102 when the aircraft 102 is being flown on autopilot or the feature may take control of the aircraft 102 from a human pilot when the aircraft 102 is being flown manually. For example, the aircraft control system 208 is configured to control a component of the aircraft 102 to make a maneuver to avoid or reduce the likelihood of colliding with the intruder 106, such as causing the aircraft 102 to increase or decrease altitude or to steer the aircraft 102 in a certain direction.

The communications system 210 facilitates communications between the controller 202 and an external system (e.g., a satellite system, other aircraft, a terrestrial station, or other air, space, or ground-based system). For example, the communications system 210 may send data to and receive data from an external ground-based weather supplier system and a ground-based air traffic control system. The communications system 210 is configured to communicate with the external system using any type of communication protocol or network (e.g., via a mobile network, via one or more bi-directional or uni-directional communication channels) and may include any type of wired or wireless interface for facilitating the communication. It should be understood that the controller 202 is configured to interpret and process any type of data received from any type of system either internal or external from the aircraft 102.

The aircraft monitoring system 212 includes at least one of a GPS, a Global Navigation Satellite System (GNSS), an altitude heading and reference system (AHRS), and an inertial reference system (IRS). The aircraft monitoring system 212 is configured to acquire flight data indicative of at least one flight characteristic of the aircraft 102. The flight characteristic may include, for example, a ground speed, a vertical speed, a pitch angle, an altitude, a course, and a heading. The aircraft monitoring system 212 is configured to communicate flight data to the controller 202 for processing and analysis.

Figure 3:
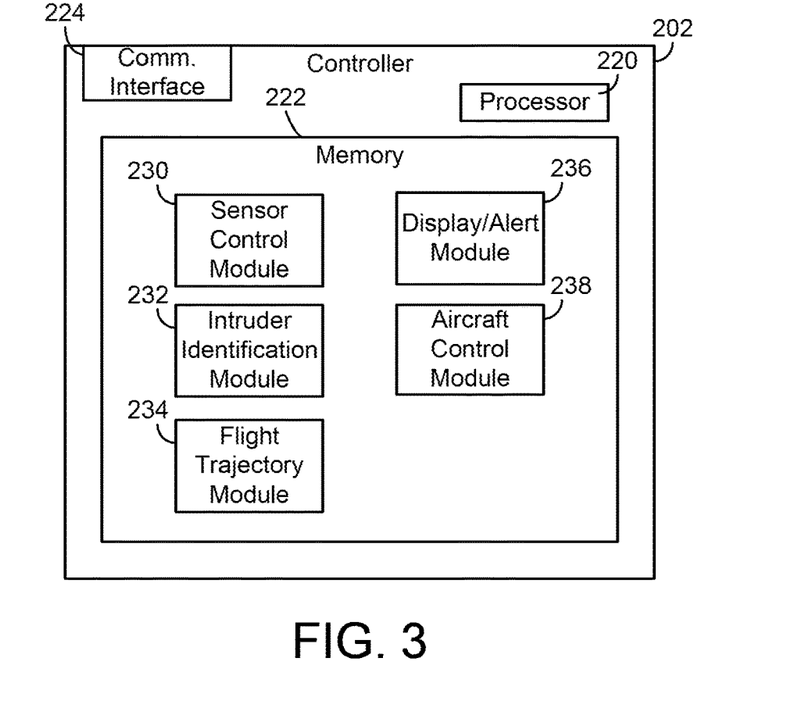
FIG. 3 is a block diagram of an exemplary embodiment of the controller of the collision avoidance system of FIG. 1.

Referring now to FIG. 3, a block diagram of an exemplary embodiment of the controller 202 of the collision avoidance system 104 of FIG. 1 is shown according to the inventive concepts disclosed herein. The controller 202 includes a processor 220, a memory 222, and a communications interface 224.

The processor 220 may be implemented as a specific purpose processor, an application specific integrated circuit (ASIC), one or more field programmable gate arrays (FPGAs), a group of processing components, or other suitable electronic processing components. The memory 222 is one or more devices (e.g., RAM, ROM, flash memory, hard disk storage) for storing data and computer code for completing and facilitating the various user or client processes, layers, and modules described in the present disclosure. The memory 222 may be or include volatile memory or non-volatile memory and may include database components, object code components, script components, or any other type of information structure for supporting the various activities and information structures of the inventive concepts disclosed herein. The memory 222 is communicably connected to the processor 220 and includes computer code or instruction modules for executing one or more processes described herein. The controller 202 further includes a communications interface 224 configured to facilitate communications between the controller 202 and the other components and systems of the collision avoidance system 104.

The memory 222 includes various modules that cause the processor 220 to execute the systems and methods described herein. The memory 222 includes a sensor control module 230, an intruder identification module 232, a flight trajectory module 234, a display/alert module 236, and an aircraft control module 238. The structure and function of the various modules of the memory 222 will be described in greater detail below and with reference to FIGS. 1 and 3.

The sensor control module 230 is configured to cause the processor 220 to control the optical sensor 204 of the collision avoidance system 104 to capture a first image of the intruder 106 associated with first image data. The first image data is associated with at least one image characteristic, such as a first maximum linear dimension 108 of the intruder 106, first angular coordinates of the centroid 402 of the intruder 106, and a first angular size 110 of the intruder 106. The sensor control module 230 is further configured to cause the processor 220 to control the optical sensor 204 to capture a second image of the intruder 106 associated with second image data. The second image data is associated with at least one image characteristic, such as a second maximum linear dimension 108 of the intruder 106, second angular coordinates of the centroid 402 of the intruder 106, and a second angular size 110 of the intruder 106. The optical sensor 204 is further configured to communicate the first image data and the second image data to the controller 202 where the data is processed by the processor 220.

The intruder identification module 232 is configured to cause the processor 220 to determine a first position of the intruder 106 in the first image data and a second position of the intruder 106 in the second image data, which may be indicated by the number of pixels of the intruder 106 in each image and the pixel locations in each image of the intruder 106. In some embodiments, the first position includes a first location and a first orientation of the intruder 106 at a first time, and the second position includes a second location and a second orientation of the intruder 106 at a second time after the first time. As such, the first position and the second position of the intruder 106, and the time lapse between taking the first image and the second image, are indicative of a movement rate and a course of flight of the intruder 106. For example, the processor 220 may be configured to determine first angular coordinates of the centroid 402 of the intruder 106 and a first angular size 110 of the intruder 106 in the first image data, determine second angular coordinates of the centroid 402 of the intruder 106 and a second angular size 110 of the intruder 106 in the second image data, and determine an angular position change of the intruder 106 based on a comparison of the first and second angular coordinates and first and second angular sizes. The processor 220 is further configured to determine a rate of change of a line of sight angle from the aircraft 102 to the intruder 106 based on the angular position change and a time elapsed between the first and second images, determine a rate of change of the angular size (i.e., looming rate) of the intruder 106 based on a difference in angular size 110 of the intruder from the first image to the second image and the time elapsed between the first and second images, and provide an alert in response to the ratio of the rate of change of the line of sight angle and the rate of change of the angular size of the intruder 106 being less than a threshold. In some embodiments, the processor 220 may apply temporal filtering to the first and second image data to determine the looming rate of the intruder 106 and the rate of change of the line of sight angle. It will be appreciated that in some embodiments more than two images are used to determine the rate of change of the line of sight angle from the aircraft 102 to the intruder 106 and the looming rate of the intruder 106.

In some embodiments, the intruder identification module 232 causes the processor 220 to determine an angular size 110 of the intruder 106. For example, the processor 220 can calculate the angular size 110 based on the maximum linear dimension 108 of the intruder 106 and the range 112 between the aircraft 102 and the intruder 106. For example, the angular size 110 may be determined directly from the first image data. In some embodiments, the angular size 110 of the intruder 106 is determined to be equal to the ratio of the maximum linear dimension 108 of the intruder 106 to the range 112 between the aircraft 102 and the intruder 106. It will be appreciated that any number of images may be used by the processor 220 to carry out the inventive concepts disclosed herein, and that in many scenarios, more than two images will be analyzed by the processor to determine whether or not the intruder 106 poses a collision or near miss threat to the aircraft 102.

In some embodiments, the comparison of the first position and the second position indicates a change in position of the intruder 106 from the first position to the second position over time. In some embodiments, the comparison of the first position and the second position indicates a characteristic of the flight path of the intruder 106, such as a course of the intruder 106 or the angular size 110 of the intruder 106, or a rate of change of a line of sight angle (i.e., looming rate) of the intruder 106. For example, the course of the intruder 106 may be based on the first location and first orientation of the intruder 106 and based on the second location and second orientation of the intruder 106. In some embodiments, the comparison of the first position and the second position indicates a rate of movement of the intruder 106. In some embodiments, the comparison of the first position and the second position comprises comparing a characteristic of the first and second image data. For example, the characteristic may be at least one of a number of pixels of the image that the intruder occupies, a distribution of the pixels that the intruder occupies, and a portion of the image that the intruder occupies. The intruder 106, and the pixels that the intruder 106 occupies, may be identified by analyzing the intensity of each pixel in a captured image. For example, the processor 220 may be configured to compare the intensity of each pixel with other pixels in the image, such as nearby pixels, other pixels in a region of the image, and an average pixel intensity of each pixel of the image. It will be appreciated that image recognition algorithms may be employed by the processor 220 to identify which pixels of the image data correspond to the intruder 106.

Figure 4:
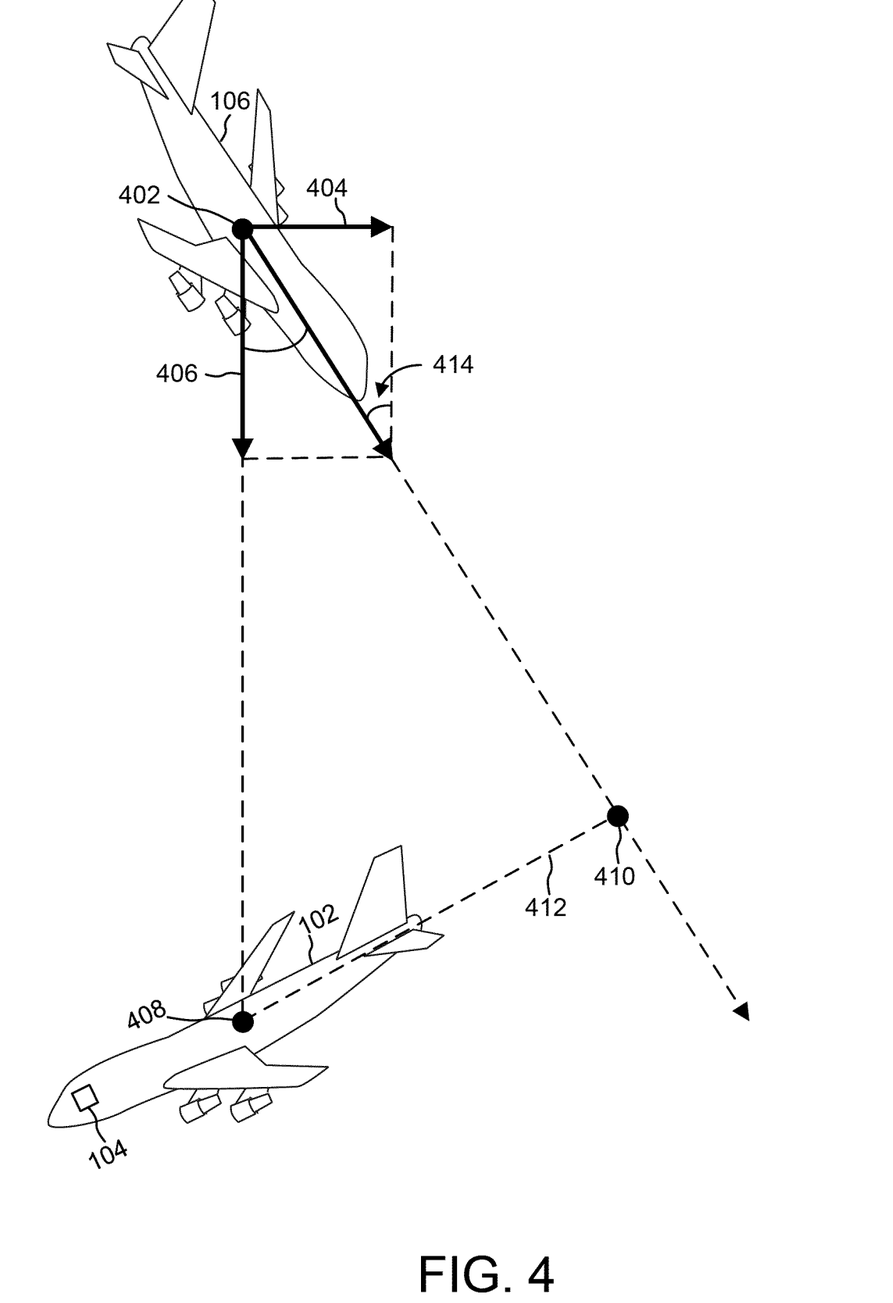
FIG. 4 is a schematic illustration of an exemplary embodiment of a detected near collision of the aircraft and the intruder according to the inventive concepts disclosed herein.

The flight trajectory module 234 is configured to cause the processor 220 to determine a size of the intruder 106 and a projected position of the intruder 106 based on a comparison of the first position and the second position. In some embodiments, the size of the intruder 106 is not an actual size of the intruder 106 but a relative size based on the projected velocity relative to the aircraft 102. The processor 220 is configured to determine the size of the intruder based on the maximum linear dimension of the intruder 106. The processor 220 is configured to determine the rate of movement of the intruder 106 based on the rate of change of the centroid 402 of the image of the intruder 106. For example, the rate of change of the centroid 402 of the intruder 106 can be determined based on how much larger the pixel size of the intruder 106 appears in the second image when compared to the pixel size of the intruder 106 in the first image. For example, the processor 220 may be configured to determine first angular coordinates of the centroid 402 of the intruder 106 and a first angular size 110 of the intruder 106 in the first image data, determine second angular coordinates of the centroid 402 of the intruder 106 and a second angular size 110 of the intruder 106 in the second image data, and determine an angular position change of the intruder 106 based on a comparison of the first and second angular coordinates and first and second angular sizes. The flight trajectory module 234 is further configured to determine a rate of change of a line of sight angle from the aircraft 102 to the intruder 106 based on the angular position change and a time elapsed between the first and second images, determine a rate of change of the angular size (i.e. looming rate) of the intruder 106 based on a difference in angular size 110 of the intruder from the first image to the second image and the time elapsed between the first and second images, and provide an alert in response to the ratio of the rate of change of the line of sight angle and the rate of change of the angular size of the intruder 106 being less than a threshold.

The flight trajectory module 234 further causes the processor 220 to determine whether the intruder 106 is on a collision course with the aircraft 102 by analyzing the first and second images (e.g., comparing differences between the first and second images). For example, in one embodiment, if the aircraft 102 and the intruder 106 are on a collision course, the center of the intruder's image in the image captured by the optical sensor 204 of the aircraft 102 will be stationary (or near stationary) from the first image to the second image of the intruder 106, and the size of the intruder 106 in the second image will be greater than the size of the intruder 106 in the first image, indicating that the intruder 106 is getting closer to the aircraft 102. In some embodiments, the size of the intruder 106 is based on the number of pixels the intruder 106 occupies in an image captured by the optical sensor 204.

The flight trajectory module 234 is configured to cause the processor 200 to determine the number of pixels of the intruder 106 in the first image, determine the number of pixels of the intruder 106 in the second image, compare the number of pixels from both images to determine a change in the number of pixels of the intruder 106 from the first image to the second image, determine a dimension of the intruder 106 based on the number of pixels of the intruder in either image, and determine an angular velocity of the intruder 106 based on the change in the number of pixels from the first image to the second image. For example, the processor 220 is configured to convert pixel measurements of the image data to angular measurements using camera calibration algorithms. The processor 220 is further configured to determine the number of dimensions of the intruder 106 that the intruder 106 will pass within the aircraft 102 based on the dimension of the intruder 106 and the angular velocity of the intruder 106.

In some embodiments, the flight trajectory module 234 causes the processor 220 to determine a time to collision of the aircraft 102 and the intruder 106. The time to collision may be based on the rate of change of the centroid 402 of the image of the intruder 106 or the rate of change of the angular size of the intruder 106. For example, the flight trajectory module 234 causes the processor 220 to compare the angular size of the intruder 106 from the first image to the angular size of the intruder 106 in the second image. The processor 220 determines that the aircraft 102 and the intruder 106 are on a collision course in response to the comparison of the angular size of the intruder 106 exceeding a change in size threshold. For example, the processor 220 may determine that the time to collision is six seconds in response to the intruder 106 occupying 10% more pixels in the second image than in the first image where the second image is taken one second after the first image. In some embodiments, the processor 220 determines characteristics of the intruder 106 with respect to the aircraft 102 using sub-pixel smoothing algorithms, fast sampling, and temporal filtering. In some embodiments, the flight trajectory module 234 causes the processor 220 to determine a size and movement of the intruder 106 in terms of pixels. For example, the processor 220 is configured to determine a number of pixels per second the intruder 106 is moving in a direction with respect to the aircraft 102 based on the difference between the first position and the second position of the intruder 106 and the difference in the number of pixels that the intruder 106 occupies in the second image when compared with the number of pixels that the intruder 106 occupies in the first image.

In another example, when the aircraft 102 and the intruder 106 are on a head-on collision course with closure rate of 100 meters per second, a minimum time required to avoid collision may be twelve seconds, at which the distance between the aircraft 102 and the intruder 106 is 1,200 meters. The aircraft 102 may be equipped with six cameras, each with a field of view of 60 degrees by 60 degrees, covering 360 degrees of azimuth around the aircraft 102 and having +/−30 degrees view above and below the plane of the aircraft 102 wing, where the linear resolution of the camera is 5,000 pixels (e.g., a 25 megapixel camera). If the intruder 106 has a wingspan of 11 meters, the angular size of the wingspan of the intruder 106 at −1100 meters is roughly 10 mrad, or about 50 pixels in the images captured by the camera system. In the example above, the processor 220 is configured to determine that the aircraft 102 and the intruder 106 will collide in about 10 seconds based on the looming rate of the intruder being roughly 5 pixels per second. In some embodiments, the processor 220 is configured to determine the time to collision within 10% accuracy of an actual time to collision.

The display/alert module 236 is configured to cause the processor 220 to control the collision alert system 206 to provide an alert to an operator of the aircraft 102, flight crew of the aircraft 102, and to an air traffic controller. The display/alert module 236 is configured to provide the alert in response to the projected position of the intruder 106 being within a threshold distance from a projected position of the aircraft 102. For example, if the threshold distance is expressed in terms of a ratio of the wingspan or maximum linear dimension 108 of the intruder 106, the display/alert module 236 provides an alert in response to the threshold distance being less than ten wingspans of the intruder 106. In some embodiments, the display/alert module 236 is configured to combine, separate, and modify the imagery received from the optical sensor 204 and to provide the edited imagery to a display system onboard the aircraft 102 or external to the aircraft 102. For example, the display/alert module 236 may cause imagery of the intruder 106 to be displayed on a display screen located in the cockpit of the aircraft 102 and on a display screen located in a terrestrial station, such as an air traffic control center.

The aircraft control system 208 is configured to automatically control the aircraft 102 to avoid colliding with the intruder 106. The aircraft control system 208 may be an autopilot feature that controls the aircraft 102 when the aircraft 102 is being flown on autopilot or the feature may take control of the aircraft 102 from a human pilot when the aircraft 102 is being flow manually. For example, the aircraft control system 208 is configured to control a component of the aircraft 102 to make a maneuver to avoid or reduce the likelihood of colliding with the intruder 106, such as causing the aircraft 102 to increase or decrease altitude or to steer the aircraft 102 in a certain direction.

The aircraft control module 238 is configured to cause the processor 220 to control the aircraft control system 208 of the collision avoidance system to automatically control the aircraft 102 to avoid colliding with the intruder 106. In some embodiments, the aircraft control module 238 is configured to control the aircraft 102 based on a characteristic of the aircraft 102 and the intruder 106 or a characteristic of the aircraft 102 with respect to the intruder 106. For example, in one embodiment, the aircraft control module 238 is configured to control the aircraft 102 based on the aircraft 102 and the intruder 106 being on a collision course, the rate of movement of the intruder 106, and the course of the intruder 106 with respect to the aircraft 102.

FIG. 4 is a schematic illustration of an exemplary embodiment of a detected near collision of the aircraft 102 and the intruder 106 according to the inventive concepts disclosed herein. Based on the image data of the intruder 106 received by the processor 220 from the optical sensor 204, the processor 220 is configured to determine a centroid 402 of the intruder 106, characteristics (e.g., angular rates) of the intruder 106 indicative of a relative velocity 404 of the intruder 106, and characteristics (e.g., angular rates) of the intruder 106 indicative of a closure rate 406 of the intruder 106 with respect to a centroid 408 of the aircraft 102. For example, the processor 220 may determine the relative velocity 404 of the intruder 106 based on a ratio of the perpendicular component of relative velocity 404 to a distance between the intruder 106 and the aircraft 102. The processor 220 may be configured to determine a ratio of the closure rate 406 of the intruder 106 to the distance between the intruder 106 and the aircraft 102 by dividing the looming rate of the intruder 106 by the angular size of the intruder 106. The processor 220 is further configured to determine a minimum approach point 410 of the aircraft 102 and the intruder 106 based on the centroid of the intruder 402, the centroid of the aircraft 408, the relative velocity 404 of the intruder 106, and the closure rate 406 of the intruder. In some embodiments, the relative velocity 404 of the intruder 106 is a relative velocity component perpendicular to the line of sight of the aircraft 102. In some embodiments, the minimum approach point 410 is the point at which the intruder 106 will come within a minimum distance 412 of the aircraft 102. In some embodiments, the processor 220 determines that a near collision or an actual collision will occur based on the projected position of the intruder coming within the minimum distance 412 of the aircraft 102. For example, the minimum distance could be a default distance or a distance based on a characteristic of the aircraft 102, a characteristic of the intruder 106 (e.g., a wing span, a multiple of a wing span, a velocity of the intruder 106), and a weather characteristic (e.g., a wind speed, a visibility measure, a precipitation rate, a wind shear amount). For example, in one embodiment, the processor 220 determines that a near collision will occur based on a projection that the intruder 106 will come within 10 wing spans of the intruder 106 at the minimum approach point 410. In another example, the processor 220 determines that a near collision will occur based on a projection that the intruder 106 will come within the minimum distance 412 of the aircraft 102 based on the ratio of transverse angular velocity of the intruder 106 to the looming rate in pixels per second being less than 10 (e.g., when the intruder 106 occupies 10 additional pixels in the second image when the optical sensor 204 is a 10 Hz camera capturing 10 images per second). In another example, the processor 220 is configured to determine how many wing spans of the intruder 106 that the intruder 106 will pass the aircraft 102 within based only on the change in pixel count from the first image to the second image, the change in pixel location from the first image to the second image, and a time between the first image and the second image being taken.

In some embodiments, the processor 220 is configured to utilize at least one algorithm to determine whether the intruder 106 poses a collision threat to the aircraft 102. For example, referring back to FIG. 1, upon receiving image data from the sensor 204, the processor 220 may be configured to determine the angular size 110 of the intruder 106 as observed by the sensor 204 using the following exemplary equation:

$$\varphi \approx \frac{b}{r} \quad \text{(Equation 1)}$$

where $\varphi$ is the angular size of the intruder, b is the maximum linear dimension of the intruder, and r is the range between the intruder 106 and the aircraft 102. Assuming that if the intruder 106 and the aircraft 102 are on a collision course, the intruder 106 will be stationary or substantially stationary in consecutive images acquired by the sensor 204. Next, the processor 220 may be configured to determine the rate of change of the linear size of the intruder 106 using the following exemplary equation:

$$\dot{\varphi} \approx -\frac{b\dot{r}}{r^2} = -\varphi\frac{\dot{r}}{r} \quad \text{(Equation 2)}$$

where $\dot{r}$ is the rate of change of the range between the intruder 106 and the aircraft 102. Next, the processor 220 may be configured to determine a time to collision of the intruder 106 and the aircraft 102 by, for example, combining Equation 1 and Equation 2, which results in the following exemplary equation:

$$t = -\frac{r}{\dot{r}} = \frac{\varphi}{\dot{\varphi}} \quad \text{(Equation 3)}$$

where t equals the time to collision of the intruder 106 and the aircraft 102. In other words, time collision is equal to the negative ratio of range to range rate. For example, in algorithmic terms, the range rate on a collision course is negative, and as the range gets smaller the time to collisions also becomes smaller. The time to collision may also be determined as being equal to the ratio of the angular size of the intruder 106 to the looming rate. However, it will be appreciated that determining a time to collision is not required for the collision avoidance system 104 to detect a near collision or an actual collision. The processor 220 may be configured to derive the relationship between a rate of change of the line of sight angle, a component of relative velocity 404 of the intruder 106 with respect to the aircraft 102 perpendicular to the line of sight connecting the intruder 106 and the aircraft 102, and the range between the intruder 106 and the aircraft 102 using the following exemplary equation:

$$\dot{\mu} = \frac{V_T}{r} \quad \text{(Equation 4)}$$

where $V_T$ is the component of relative velocity 404 of the intruder 106 with respect to the aircraft 102 perpendicular to the line of sight connecting the intruder 106 and the aircraft 102. The processor 220 may be further configured to derive the relationship between the minimum distance between the intruder 106 and the aircraft 102 at the potential minimum approach point 410, the range between the intruder 106 and the aircraft 102, and the angle 414 of the relative velocity of the intruder 106 with respect to the aircraft 102 using the following exemplary equation:

$$d \approx r\beta \quad \text{(Equation 5)}$$

where r is the range between the intruder 106 and the aircraft 102, and where β is the angle 414 of the relative velocity of the intruder 106 with respect to the aircraft 102. Next, using at least the derived equations (e.g., Equations 4 and 5), the processor 220 may be configured to determine the ratio of the minimum distance between the aircraft 102 and the wingspan of the intruder 106 using the following exemplary equation:

$$\frac{d}{b} = \frac{r\beta}{r\varphi} = \frac{V_T}{V_{r\varphi}} = \frac{r\dot{\mu}}{v_{r\varphi}} = \frac{\varphi}{\dot{\varphi}}\frac{\dot{\mu}}{\varphi} = \frac{\dot{\mu}}{\dot{\varphi}} \quad \text{(Equation 6)}$$

where $V_r$ is the closure rate 406 between the intruder 106 and the aircraft 102. In some embodiments, the processor 220 is configured to assume that $V_r$ is less than $V_T$ (i.e., the intruder 106 is closing in on the aircraft 102 at a faster rate than the intruder 106 travels at a relative direction with respect to the aircraft 102), which is reasonable for a near collisions situation.

In some embodiments, a near collision is determined if the intruder 106 is expected to pass within a threshold distance of the aircraft 102. The threshold distance may be defined in any number of ways, such as, for example, a ratio of the wingspan of the intruder 106. For example, the threshold distance may be determined based on a ratio of the maximum linear dimension 108 of the intruder 106 with respect to the minimum distance 412 between the intruder 106 and the aircraft 102 at the potential minimum approach point 410. For example, the processor 220 may be configured to determine the threshold for a near collision using the following exemplary equation:

$$\frac{\dot{\mu}}{\dot{\varphi}} < 10 \quad \text{(Equation 7)}$$

where the numeral 10 represents the number of wingspans or maximum linear dimensions 108 of the intruder. In some embodiments, the process 220 is configured to determine that a near collision will occur if the ratio of the angular velocity of the intruder 106 with respect to the rate of change of the linear size of the intruder 106 is less than 10 wingspans of the intruder 106. In other words, the near collision is detected if the ratio of transverse angular velocity to the looming rate is less than 10. It will be appreciated that any number of wingspans may be used for Equation 7 and that this number may vary (e.g., less than 5, greater than 5, about 10, 20 wingspans or maximum linear dimensions 108 of the intruder 106). For example, since the actual size of the intruder 106 may be unknown, the processor 220 may determine how much of a threat the intruder 106 poses to the aircraft 102 based on how many wingspans of the intruder 106 that the intruder passes within the aircraft 102. For example, zero wingspans indicates that the intruder 106 and the aircraft 102 will actually collide, and any number of wingspans less than ten wingspans indicate a near miss that will be dangerous to the aircraft 102.

Figure 5:
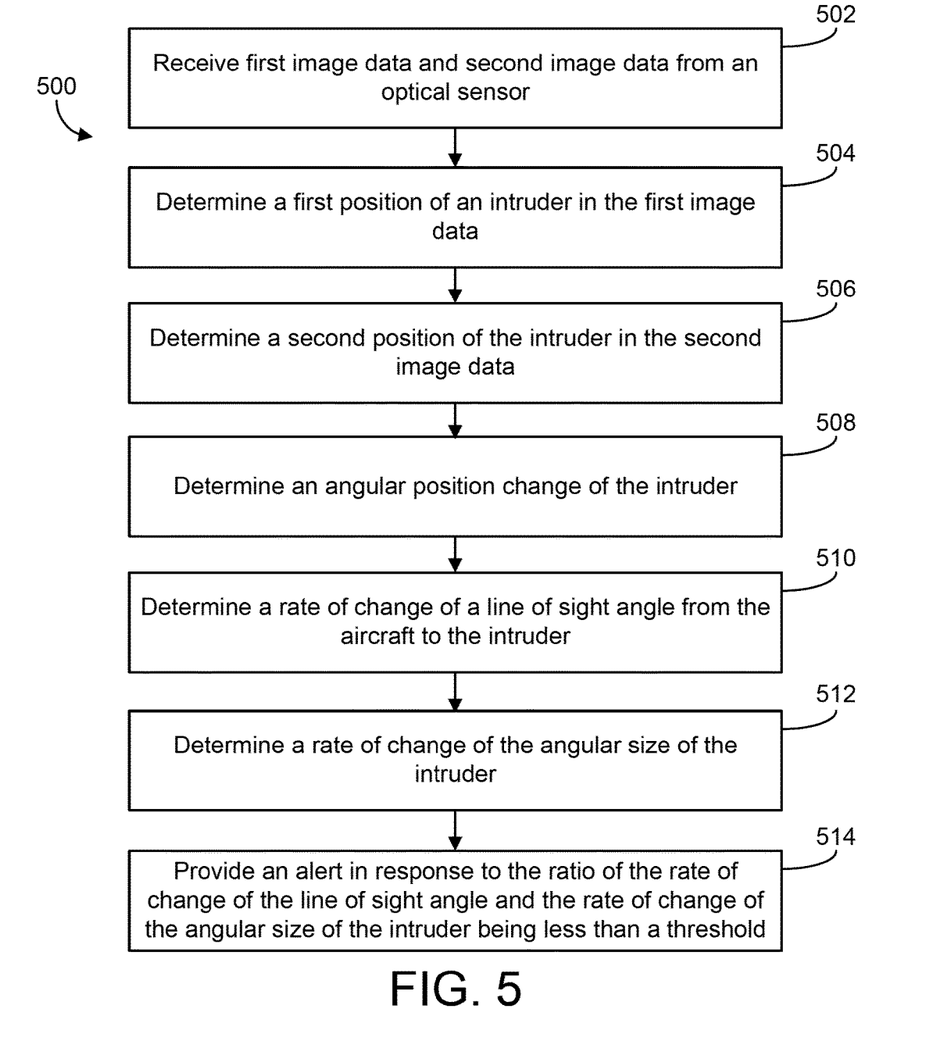
FIG. 5 is a diagram of an exemplary embodiment of a method of detecting a collision with an intruder according to the inventive concepts disclosed herein.

Referring now to FIG. 5, an exemplary embodiment of a method according to the inventive concepts disclosed herein may include the following steps.

A step (502) may include receiving first image data and second image data from an optical sensor. The processor 220 is configured to receive image data from the optical sensor 204. For example, the first image data is associated with a first image captured by the optical sensor 204, and the second image data is associated with a second image captured by the optical sensor 204.

A step (504) may include determining a first position of an intruder 106 in the first image data. The processor 220 is configured to determine the first position of the intruder 106 based on the pixels that the intruder 106 occupies in the first image data.

A step (506) may include determining a second position of the intruder 106 in the second image data. The processor 220 is configured to determine the second position of the intruder 106 based on the pixels that the intruder 106 occupies in the second image data.

A step (508) may include determining an angular position change of the intruder 106. The processor 220 may be configured to determine the angular position change of the intruder 106 based on a comparison of the first position of the intruder 106 in the image data with the second position of the intruder 106 in the image data. The first position of the intruder 106 corresponds with a first location and a first orientation of the intruder 106 in the image data at a first time. The second position of the intruder 106 corresponds with a second location and a second orientation of the intruder 106 in the image data at a second time after the first time. The comparison of the first position and the second position may indicate a flight characteristic of the intruder 106, such as a course, angular velocity, and rate of closure to the aircraft 102.

A step (510) may include determining a rate of change of a line of sight angle from the aircraft 102 to the intruder 106. The processor 220 may be configured to determine the rate of change of the line of sign angle from the aircraft 102 to the intruder 106 based on the angular position change and a time elapsed between the first and second images. The processor 220 may be configured to determine the rate of change of the line of sight angle using the angular position change of the intruder 106 derived from comparing the first and second positions of the intruder 106 in the first and second images, respectively, and the amount of time that elapsed between capturing the first image and the second image.

A step (512) may include determining a rate of change of the angular size of the intruder 106. The processor 220 may be configured to determine the rate of change of the angular size (i.e. looming rate) of the intruder 106 based on a difference in angular size 110 of the intruder 106 from the first image to the second image and the time elapsed between the first and second images.

A step (514) may include providing an alert in response to the ratio of the rate of change of the line of sight angle and the rate of change of the angular size of the intruder 106 being less than a threshold. The processor 220 may be configured to provide the alert to an operator of the aircraft 102. The processor 220 may further be configured to provide the alert based on an environmental factor (e.g., a weather condition). In some embodiments, the ratio of the rate of change of the line of sight angle and the rate of change of the angular size of the intruder 106 being less than a threshold indicates that the intruder 106 is within a predefined distance of the aircraft 102. The predefined distance may be expressed in terms of a ratio (e.g., within 10 wingspans of the intruder, within 15 wingspans of the intruder). In some embodiments, the alert is provided to an aircraft autopilot system and causes the aircraft autopilot system to cause the aircraft 102 to change a course or speed or otherwise divert from the path of the intruder 106.

As will be appreciated from the above, midair collision threat detection and assessment using visual information according to embodiments of the inventive concepts disclosed herein may enable aircraft too small to carry due regard radar to detect intruders using cameras and image processing algorithms to detect near collisions and actual collisions and for estimating time to collision, and to provide collision avoidance solutions without knowing the actual distance between an aircraft and an intruder.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An aircraft collision avoidance system, comprising:
   at least one processor with a non-transitory processor-readable medium storing processor-executable code for causing the at least one processor to:
      receive first image data and second image data from an optical sensor, the first image data associated with a first image captured by the optical sensor, the second image data associated with a second image captured by the optical sensor;
      determine a first position and a first angular size of an intruder in the first image data;
      determine a second position and a second angular size of the intruder in the second image data;
      determine an angular position change of the intruder based on a comparison of the first and second positions and first and second angular sizes;
      determine a rate of change of a line of sight angle from an aircraft to the intruder based on the angular position change and a time elapsed between the first and second images;
      determine a rate of change of the angular size of the intruder based on a difference in angular size of the intruder from the first image to the second image and the time elapsed between the first and second images; and
      provide an alert via an aircraft alert system to an operator of the aircraft and control the aircraft, using an aircraft control system, to avoid colliding with the intruder, wherein providing the alert and controlling the aircraft are in response to a ratio of the rate of change of the line of sight angle and the rate of change of the angular size of the intruder being less than a threshold.

2. The aircraft collision avoidance system of claim 1, wherein providing the alert is based on an amount of time until the ratio of the rate of change of the line of sight angle and the rate of change of the angular size of the intruder will be less than the threshold.

3. The aircraft collision avoidance system of claim 2, wherein the threshold is based on a wingspan of the intruder.

4. The aircraft collision avoidance system of claim 1, wherein the first position comprises a first location and a first orientation of the intruder at a first time, and wherein the second position comprises a second location and a second orientation of the intruder at a second time after the first time.

5. The aircraft collision avoidance system of claim 4, wherein the comparison of the first position and the second position indicates a rate of movement of the intruder and a maximum linear dimension of the intruder.

6. The aircraft collision avoidance system of claim 1, wherein the first position is indicative of first angular coordinates of a centroid of the intruder in the first image and the second position is indicative of second angular coordinates of the centroid of the intruder in the second image.

7. The aircraft collision avoidance system of claim 1, wherein the comparison of the first position and the second position comprises comparing a characteristic of the first and second image data, the characteristic being at least one of a number of pixels that the intruder occupies, a distribution of the pixels that the intruder occupies, and a portion of the image that the intruder occupies.

8. The aircraft collision avoidance system of claim 1, wherein the optical sensor is a monocular camera.

9. A method, comprising:
   receiving first image data and second image data from an optical sensor, the first image data associated with a first image captured by the optical sensor, the second image data associated with a second image captured by the optical sensor;
   determining a first position of an intruder in the first image data;
   determining a second position of the intruder in the second image data;
   determining an angular position change of the intruder based on a comparison of the first position with the second position;
   determining a rate of change of a line of sight angle from the aircraft to the intruder based on the angular position change and an elapsed time between capturing the first image data and the second image data;
   determining a rate of change of the angular size of the intruder based on a difference in angular size of the intruder from the first image data to the second image data and the time elapsed between the first and second images;
   controlling, using an aircraft control system, the aircraft to avoid colliding with the intruder in response to a ratio of the rate of change of the line of sight angle and the rate of change of the angular size of the intruder being less than a threshold.

10. The method of claim 9, wherein the comparison of the first position and the second position indicates a change in position of the intruder from the first position to the second position over time.

11. The method of claim 9, wherein the first position comprises a first pixel size of the intruder at a first time, and wherein the second position comprises a second pixel size of the intruder at a second time after the first time.

12. The method of claim 11, wherein the comparison of the first pixel size and the second pixel size indicates a maximum linear dimension of the intruder.

13. The method of claim 12, wherein the comparison of the first pixel size and the second pixel size indicates a rate of movement of the intruder.

14. The method of claim 9, wherein the alert indicates a maneuver for the aircraft to take to avoid a near miss.

15. An aircraft collision avoidance system, comprising:
an optical sensor; and
at least one processor with a non-transitory processor-readable medium storing processor-executable code for causing the at least one processor to:
receive first image data and second image data from the optical sensor, the first image data associated with a first image captured by the optical sensor, the second image data associated with a second image captured by the optical sensor;
determine a rate of change of a line of sight angle of the intruder and a rate of change of the angular size of the intruder with respect to an aircraft based on a comparison of the first image data and the second image data;
control, using an aircraft control system, the aircraft to avoid colliding with the intruder in response to a ratio of the rate of change of the line of sight angle and the rate of change of the angular size of the intruder being less than a threshold, the threshold comprising a ratio of a determined size of the intruder.

16. The aircraft collision avoidance system of claim 15, wherein the threshold is based on a number of dimensions of the intruder.

17. The aircraft collision avoidance system of claim 16, wherein the dimension of the intruder is based on a quantity of pixels of the intruder in at least one of the first image and the second image.

18. The aircraft collision avoidance system of claim 17, wherein a location of the pixels of the intruder in the first image are the same as or substantially similar to the location of the pixels of the intruder in the second image, the processor-executable code further causing the at least one processor to determine that the intruder will cause at least one of a collision or a near collision with the aircraft.

19. The aircraft collision avoidance system of claim 15, wherein the rate of change of a line of sight angle from the aircraft to the intruder is based on an angular position change of the intruder from the first image to the second image.

20. The aircraft collision avoidance system of claim 15, wherein the threshold is a ratio of a minimum allowed distance between the aircraft and the intruder over a dimension of the intruder.

* * * * *